Oct. 18, 1927.
H. JUNKERS
PROPELLER
Filed July 1, 1925
1,645,811
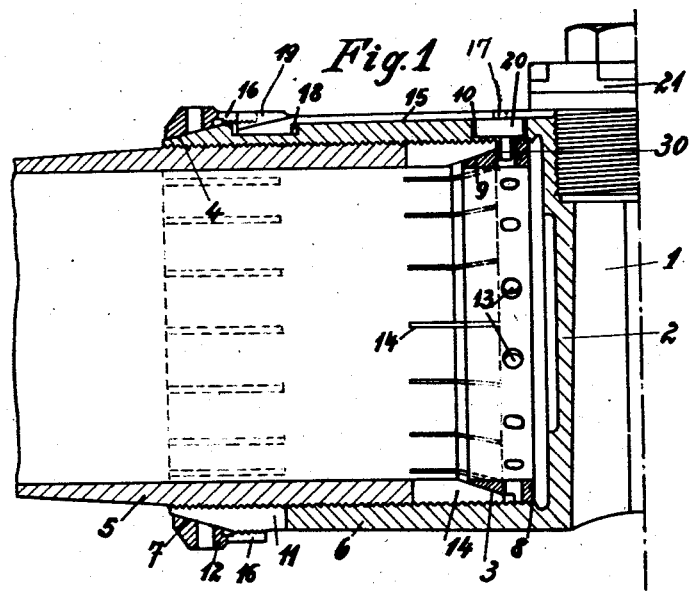
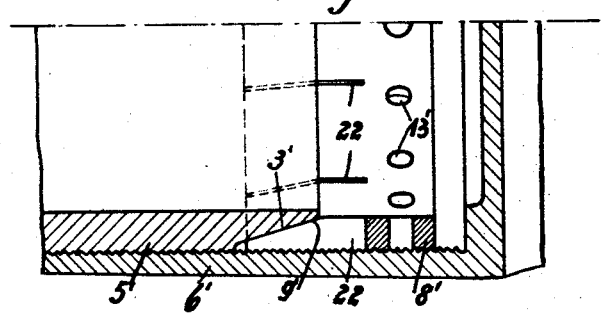
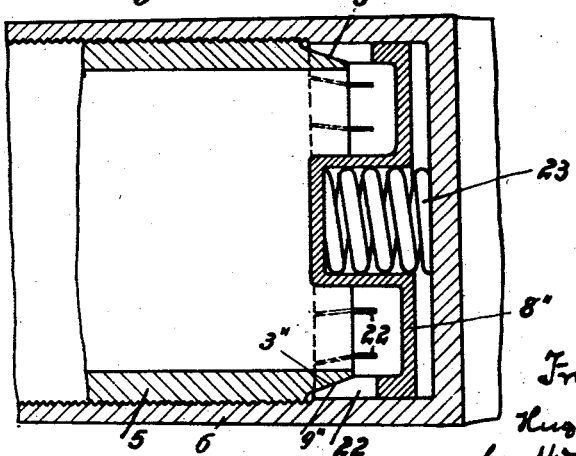
Inventor
Hugo Junkers
by Kintner
atty.

Patented Oct. 18, 1927.

1,645,811

UNITED STATES PATENT OFFICE.

HUGO JUNKERS, OF DESSAU, GERMANY.

PROPELLER.

Application filed July 1, 1925, Serial No. 40,780, and in Germany July 17, 1924.

My invention refers to propellers more especially for use in connection with flying machines. It is an object of my invention to provide a propeller, the blades of which are attached to the hub in a more reliable manner than was the case in the propellers hitherto used.

In propellers, the blade of which is fixed to the hub by its shaft, the points where the blades are attached to the hub are subject to strains which vary both in magnitude and in direction. These strains are the cause of vibrations of the blade shafts relative to the hub body, which can even lead to a breakage. In propellers, in which the blade shafts are connected with sleeves on the hub by screwing, the centrifugal forces being taken up by the screw thread, one has tried to provide for the vibrating stresses by pressing the end of the hub sleeve against the shaft of the blade. However, such pressing together of the parts in a single place can never be entirely successful and oscillations can arise around this place inasmuch as the screw thread itself must have a certain play and therefore cannot offer a sufficient resistance to the vibrating forces.

According to the present invention a connection between the propeller blade and the hub body which is free of all vibrational stresses, is obtained by forcing the blade shaft and the hub body against one another in at least two places arranged in series one behind the other in the direction of the centrifugal action, the parts being forced against each other directly or indirectly, suitable transmission members being inserted between them. Besides avoiding vibrations of the blade shaft in the hub body the novel arrangement further involves the advantage that the distance along which the hub sleeve overlaps the propeller shaft can be made shorter than was hitherto admissible and in consequence thereof the weight of the propeller is reduced. The centrifugal forces can be taken up in any suitable manner, for instance by means of a screw thread or a kind of bayonet joint. Preferably the means for taking up the centrifugal forces are arranged intermediate between the two places in which the parts are pressed against each other.

In a preferred form of my invention I cause the blade shaft screwed into or onto a hub sleeve and provided with a conical end face to be pressed in one place against the hub sleeve by a structural part provided with a corresponding conical face and connected with the sleeve, while in another place the end of the hub sleeve is pressed against the shaft. In order to provide for an adjusting of the pitch of the propeller when the shaft is connected with the hub by screwing, a separate member pressing the end of the shaft against the hub sleeve can be arranged on this sleeve for displacement, for instance by screwing. If the end of the blade shaft and the hub sleeve are pressed against each other indirectly, the member to be forced in between the two parts is preferably made resilient in radial direction in order to secure a proper pressing action. I can press the end of the hub sleeve against the blade shaft by means of a pressure ring placed on the slightly conical, radially yielding end of the hub sleeve. Both, the member which causes the end of the blade shaft to be pressed against the hub sleeve and the pressure ring pressing the end of the sleeve against the shaft are preferably held in position by a common locking means in order to prevent loosening of the parts.

In the drawings affixed to this specification and forming part thereof three forms of a propeller embodying my invention are illustrated diagrammatically by way of example. In the drawings Fig. 1 is an axial section of the hub, with one of the sleeves and the end of a blade shaft mounted therein, one half of the propeller shaft being shown in elevation.

Fig. 2 illustrates in a similar manner one half of a hub sleeve and propeller shaft fastened together in a different way.

Fig. 3 is an axial section of part of a hub sleeve and propeller shaft with means for pressing same together in a resilient manner.

Referring first to Fig. 1, 1 is the propeller shaft and 2 is the hub locked thereon by means of a locking member 21. 6 is one of the two sleeves, internally screw threaded, forming part of the hub 2, and 5 is the externally screw threaded end of the hollow shaft of a blade fixed in the sleeve 6. The end of the hollow shaft is made resilient by radial slots 14 and a conical surface 3 is provided near the free edge of the shaft. A screw threaded ring 8 is screwed into the sleeve 6 below the shaft 5 and a conical outer surface 9 on this ring is forced into contact with the inner conical surface 3 of the blade shaft, displacing ring 8 by screwing in outward direction. The pressure exerted on the end of the shaft by the ring causes this end to be forced against the inner threaded wall of sleeve 6. Ring 8 can be displaced by screwing from the outside by introducing a suitable tool through an aperture 10 provided in the sleeve 6, this tool entering suitable holes 13 arranged in the ring 8.

The outer end of sleeve 6 is also made resilient by means of radial slots 11 and is provided with external screw threads. The outer surface of the free end of the sleeve has conical form and a pressure ring 12 screwed down upon the sleeve and having an inner conical surface 7 will press the end of the sleeve against the outer threaded surface of the blade shaft 5.

The shaft and sleeve are thus pressed against each other in two places arranged one behind the other in the direction of the centrifugal action.

In order to prevent the loosening of the parts pressed together, a ledge 15 is mounted on the sleeve, a tongue 19 on this ledge extending into slots 16 provided in the pressure ring 12, while at the other end of the ledge a recess 17 is provided into which projects a locking member 20 which is seated in the aperture 10 of the sleeve and carries a pin 30 projecting into one of the holes 13 of the pressure ring 8. The ledge 15 is held in position by extending into a cavity 18 formed in the sleeve, one of its ends projecting from below into the locking nut 21 screwed into the hub and locked against unscrewing. In this manner a loosening of the pressure rings 12 and 8 is avoided.

In the modification illustrated in Fig. 2 the end of blade shaft 5' and sleeve 6' are pressed against each other indirectly by means of the pressure ring 8' provided with holes 13' and radial slots 22, this ring having an inner conical surface 9' which is forced by screwing against the outer conical surface 3' of the blade shaft.

In the modification illustrated in Fig. 3, the pressure ring 8'' has a smooth outer surface and is forced with its conical inner surface 9'' against the conical outer surface 3'' of the blade shaft by centrifugal forces acting on it during the rotation of the propeller. A powerful spring 23 inserted between the bottom of the sleeve and the pressure ring 8'' serves for assisting the centrifugal action in pressing the parts together, and this spring might as well be replaced by a resiliently formed bottom of ring 8''. This modification allows shaft 5 of the blade to be turned in the screw thread of sleeve 6 in order to vary the pitch without it being necessary to first disengage the ring 8'' from the shaft and to thereafter apply it again. In this case the pressing action of ring 8'' is independent from the position of the blade shaft.

Obviously in all the cases shown and described the position of the parts might as well be reversed, the hollow shaft of the blade being mounted on the outer surface of the sleeve.

I wish it to be understood that I do not desire to be limited to the exact details of construction shown and described for obvious modifications will occur to a person skilled in the art.

I claim:—

1. Propeller comprising a hub, a blade mounted on this hub the contiguous ends of said parts being formed with a conical surface and yielding under pressure and conical means displaceable by screwing relatively to said parts for pressing them together by the said conical ends.

2. Propeller comprising a hub, a sleeve fixed to said hub, the hollow shaft of a blade mounted in contact with said sleeve, and a wedge-like ring inserted between said parts, said ring being displaceable in axial direction.

3. Propeller comprising a hub, a sleeve fixed to said hub, the hollow shaft of a blade mounted in contact with said sleeve, and a radially yielding wedge-like ring inserted between said parts, said ring being displaceable in axial direction.

4. Propeller comprising a hub, a blade mounted on this hub, means for pressing said blade and hub together in two places disposed one behind the other in the direction of centrifugal action and a ledge mounted on the outer wall of one of said parts so as to lock said parts against axial displacement.

In testimony whereof I affix my signature.

HUGO JUNKERS.